US009199248B2

(12) United States Patent
Au et al.

(10) Patent No.: US 9,199,248 B2
(45) Date of Patent: Dec. 1, 2015

(54) AIRCRAFT ELECTRONIC PARTICLE SEPARATION SYSTEM

(71) Applicant: HONEYWELL INTERNATIONAL INC., Morristown, NJ (US)

(72) Inventors: Henry Au, West Covina, CA (US); Dennis M. Morita, Rancho Palos Verdes, CA (US); Daniel R. Robles, Long Beach, CA (US); Hal J. Strumpf, Rancho Palos Verdes, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 161 days.

(21) Appl. No.: 14/042,883

(22) Filed: Oct. 1, 2013

(65) Prior Publication Data

US 2015/0090120 A1 Apr. 2, 2015

(51) Int. Cl.
*B03C 3/00* (2006.01)
*B03C 9/00* (2006.01)
*B01D 45/12* (2006.01)

(52) U.S. Cl.
CPC .. *B03C 9/00* (2013.01); *B01D 45/12* (2013.01)

(58) Field of Classification Search
CPC ........ B01D 45/00; B01D 59/20; B01D 59/50; B01D 59/48; B01C 1/00; B03C 3/14; B03C 3/41

See application file for complete search history.

(56) References Cited

U.S. PATENT DOCUMENTS

| | | | | |
|---|---|---|---|---|
| 2,360,595 | A * | 10/1944 | Thompson | 96/61 |
| 3,440,800 | A * | 4/1969 | Messen-Jaschin | 96/52 |
| 3,526,081 | A * | 9/1970 | Kusters | 96/61 |
| 3,668,835 | A * | 6/1972 | Vicard | 96/27 |
| 4,029,485 | A * | 6/1977 | Siwersson et al. | 96/39 |
| 5,690,720 | A * | 11/1997 | Spero | 96/26 |
| 7,524,357 | B2 * | 4/2009 | Daukant | 95/69 |

FOREIGN PATENT DOCUMENTS

DE WO2012139642 * 10/2012

* cited by examiner

*Primary Examiner* — Amber Orlando
(74) *Attorney, Agent, or Firm* — Shimokaji IP

(57) ABSTRACT

An Environmental Control System may use an electronic particle separation system to control humidity in an aircraft. The electronic particle separation system may include a charging stage and a collecting stage. The charging stage may charge airflow passing through to repel liquid particles away from the airflow. Liquid droplets may be collected by the collecting stage and centrifugally flung toward a periphery of a separator. The liquid particles may be collected outside of the airflow which may be allowed to pass through the separator and out to a destination in the aircraft without the collected liquid.

5 Claims, 3 Drawing Sheets

AIRCRAFT ELECTRONIC PARTICLE SEPARATION SYSTEM

BACKGROUND OF THE INVENTION

Figure 1:
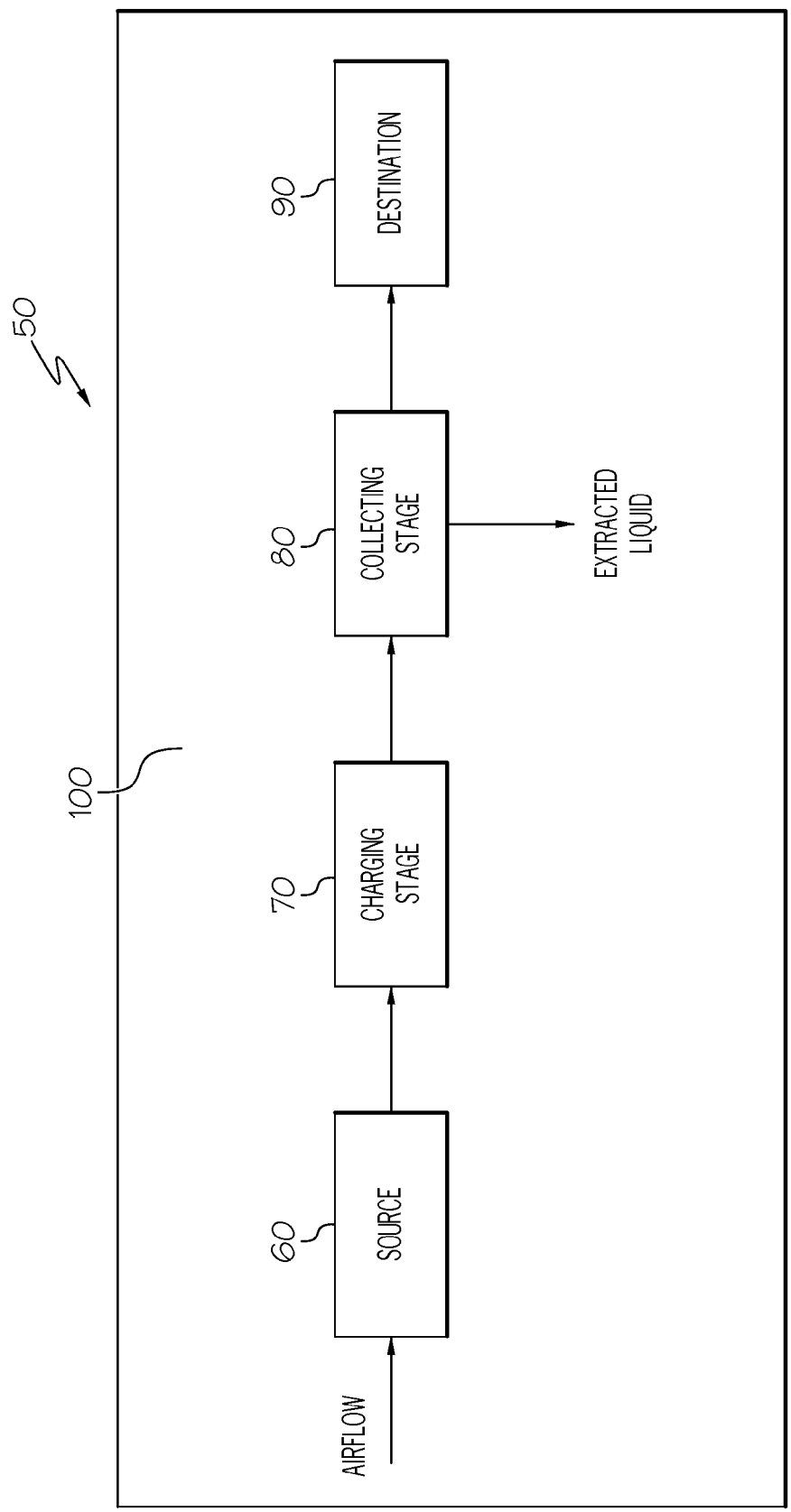

The present invention generally relates to apparatus and methods for treatment of airstreams in an Environmental Control System (ECS) to remove particles using an aircraft electronic particle separation system.

ECS of various types and complexity are used in military and civil airplane, helicopter, and spacecraft applications. In aircraft for example, airflow may be circulated to occupied compartments, cargo compartments, and electronic equipment bays. Humid air containing many pollutants such as particulate matter, aerosols, and hydrocarbons may be delivered in a heated condition to the ECS. As the humid air cools, aqueous vapor condenses into liquid. The entrained moisture may be uncomfortable for passengers, unacceptable for air-cooled electronic equipment, may cause windshield fogging, and may cause corrosion to exposed metals. The ECS may include provisions to dehumidify the air supply during cooling operations to provide a comfortable environment for the passengers and crew, where particle separation may be an important function.

Some aircraft ECS operate on an air cycle refrigeration principle. Depending on the cycle architecture, particle separation may be categorized into high-pressure, mid-pressure, and low-pressure regimes. A high-pressure extractor typically removes the entrained moisture prior to expansion in the air cycle machine. A mid-pressure separation may be performed on air expanded by the high-pressure stage, but prior to expansion in the low-pressure stage in an air cycle machine with two cooling stages. A low-pressure separator typically removes the entrained moisture following expansion in the air cycle machine. In some separator systems, coalescence based separators may use filters to capture and agglomerate the small particles in airflow into larger droplets. Coalescence based separators typically have significant system pressure drops. The filters may also need frequent replacement requiring frequent maintenance on the system.

As can be seen, there may be an ongoing need to minimize system pressure drops and maintenance in ECS while maintaining liquid particle separation efficiency.

SUMMARY OF THE INVENTION

In one aspect of the present invention, a particle separation system for treatment of airstream in an Environmental Control System (ECS) comprises a humidity source; a particle charging stage configured to electrically charge an airstream provided by the humidity source; and a particle separator stage configured to collect liquid particles separated from the charged airstream.

In another aspect of the present invention, a particle separation system comprises an inlet duct adapted for receiving an airstream from an air turbine; a housing coupled to the inlet duct, the housing configured to pass the airstream through the housing; a charging system in the housing, the charging system disposed to electrically charge particles in the airstream passing through the housing; and an inertial-based separator in the housing configured to separate charged particles from the airstream.

In yet another aspect of the present invention, a method of controlling humidity in an ECS using a particle separation system comprises providing from a source in the aircraft, an airstream containing liquid particles into a charging system; ionizing the liquid particles in the charging system; transferring the ionized liquid particles to an inertial-based separator; separating the ionized liquid particles in the separator; and providing the airstream without the collected liquid particles to a destination in the aircraft.

These and other features, aspects and advantages of the present invention will become better understood with reference to the following drawings, description and claims.

BRIEF DESCRIPTION OF THE DRAWINGS

FIG. 1 is a block diagram of an electronic particle separation system according to an exemplary embodiment of the present invention;

FIG. 2 is a cross-sectional side view of an electronic particle separation system according to an exemplary embodiment of the present invention;

FIG. 2A is a top sectional view of a strainer shell in the system of FIG. 2; and FIG. 3 is a flow chart of a method of controlling humidity in an aircraft according to an exemplary embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides particle separation from airflow in an aircraft environment. In general, an airstream may be subjected to a charging stage and a collecting stage. During the charging stage, an electrostatic device may charge liquid particles in an airstream. In the collecting stage, liquid particles may be centrifugally moved to the periphery of the airstream where they may be collected so that the remaining airstream with less liquid content may continue to flow within the aircraft environment. In some embodiments, the features of the charging stage and/or the collecting stage may be static or fixed to their surrounding environment. By using static parts, a technician does not need to fix any moving parts or replace disposable parts, for example filters. Thus, less maintenance than conventional separators may be needed. In addition, pressure levels in embodiments of the present invention may remain substantially consistent since there are no parts that obstruct air flow (for example, a filter) which may create a difference in pressure on both sides of the filter wall through which air fluxes within the system.

Referring now to FIG. 1, an electronic particle separation system 100 is shown according to an exemplary embodiment of the present invention. The electronic particle separation system 100 may be part of an aircraft Environmental Control System (ECS) 50. The electronic particle separation system 100 generally includes a charging stage 70 and a collecting stage 80. Airflow (or airstream) from within the aircraft ECS 50 may carry liquid content providing humidity within the electronic particle separation system 100. A humidity source 60 may provide the airflow to the charging stage 70 to separate liquid content from the airflow. During the charging stage 70, liquid particles in the airflow may be subjected to an electric charge, which may cause ionization to the particles. In some embodiments, the ionized liquid particles may attach to other ionized liquid particles producing agglomerated larger liquid droplets. The liquid droplets may be provided to the collecting stage 80. In the collecting stage 80 the liquid droplets may be centrifugally moved radially away from the airstream. The liquid droplets may be collected away from the airstream and the airstream may be recirculated through the aircraft with less liquid content. In an exemplary embodiment, the airstream from the collecting stage may be provided to a destination 90 of the aircraft. The destination 90 may be for example, occupied compartments, cargo compartments, or electronic equipment bays. The liquid particles collected in the collecting stage 80 may be recirculated through the aircraft ECS 50 and repurposed for use where liquid may be desirable. Details of the electronic particle separation system 100 will be described in the following.

Figure 2:
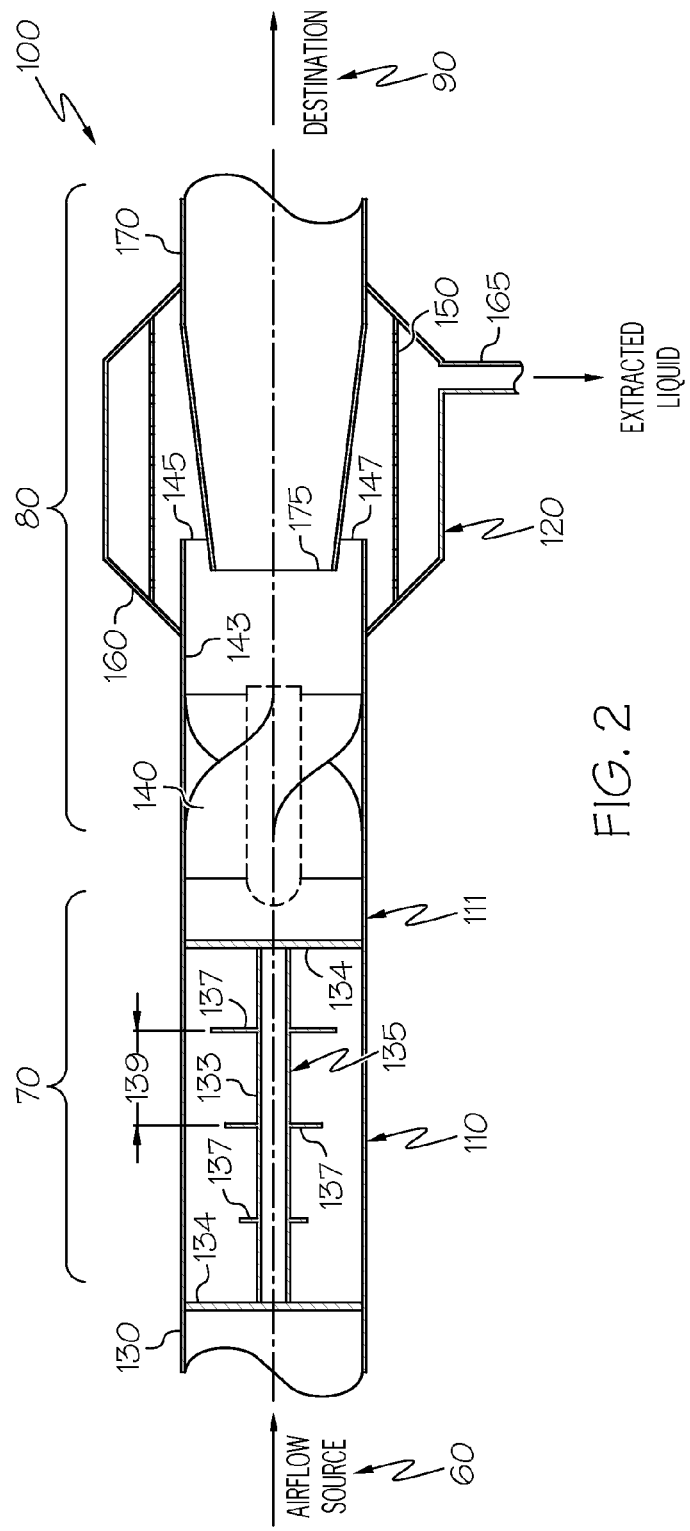

Referring now to FIG. 2, an exemplary embodiment of the electronic particle separation system 100 along with exemplary embodiments of the charging stage 70 and the collecting stage 80 are shown. For ease of illustration, the aircraft ECS 50 is omitted from view. The humidity source 60 may be for example an air turbine. It will be understood that the term "humidity source" does not necessarily indicate that the feature is dedicated to producing humidity but rather that the feature provides airflow with liquid content or by operation causes small liquid particles to form and discharge into the passing airstream. The electronic particle separation system 100 may include a housing 111 that houses the charging stage 70 and the collecting stage 80. An inlet duct 130 may couple the charging stage 70 to the humidity source 60.

In an exemplary embodiment, the charging stage 70 may include a charging system 110. The charging system 110 may include an electrode system 135 held centered to the housing 111 by insulation 134. The electrode system 135 may need to be isolated from the housing 111. The insulation 134 provides electrical isolation and may center the electrode system 135 to be equally spaced within the interior of the housing 111. An electrode system 135 may be positioned to charge the airflow passing within the charging system 110. In an exemplary embodiment, the electrode system 135 may include an inner electrode 133 and one or more outer electrodes 137 attached to the inner electrode 133. The inner electrode 133 may be, for example, a rod positioned axially and centrally along the length of the charging system 110. The outer electrode(s) 137 may be for example a disc (or other shaped plate, e.g. round, square, or hex) protruding from the inner electrode 133. The outer electrodes 137 may be of various sizes. In an exemplary embodiment, the outer electrodes 137 may be of successively increasing size as they are attached along the length of the inner electrode 133.

In operation, the inner electrode 133 may be connected to a high voltage electricity source (not shown). The housing 111 may be grounded. The high voltage conducted through the electrode system 135 may create an electric field radiating from the inner electrode 133. When the electric field intensity exceeds the maximum limit that the airstream can sustain, a corona discharge may form. Some of the energy discharged may be in the form of wavelengths of visible light. Consequently, the corona discharge in the form of a bluish light may be seen around the inner electrode 133 under some conditions. The electric field may cause the air around the electrode system 135 to ionize. During ionization, one or more of the electrons may be removed from liquid molecules in the airstream. The liquid molecules may obtain a surplus positive charge. The positive ions may be repelled from the inner electrode 133, which may be an area of powerful electrical forces. The positive ions may bombard and collide with liquid particles in the airstream and become attached. Charging the airflow may agglomerate liquid particles into larger droplets as the airflow proceeds through the charging stage 70. The repulsive force of the inner electrode 133 may generally force the ionized particles radially away from the inner electrode 133 (and thus toward the fringes of the airflow) and toward the periphery of the housing 111. Particles agglomerated by the charging stage 70 may range in size from approximately 0.05 microns to 5.0 microns.

In exemplary embodiments using outer electrodes 137 of varying size, any two outer electrodes 137 may define a segment 139 of the electrode system 135. The segments 139 may vary in electric field intensity relative to any other segment 139. In embodiments that include outer electrodes 137 of progressively increasing size, for example by using discs with progressively increasing diameter, the electric field intensity may increase along the length of the electrode system 135. Increasing the electric field intensity may ionize smaller particles in the airstream and thus help agglomerate remaining finer particles that may not have agglomerated during their exposure to smaller outer electrode(s) 137. The benefits of using multiple segments of charging system 110 may include better efficiency in separating liquid particles from the airstream In an exemplary embodiment, the collecting stage 80 may include an inertial-based separator 120 axially aligned with the housing 111. For example, the inertial-based separator 120 may use a curved or swirl-type vane 140 fixed to the housing 111. An inner strainer shell 150 may be coupled to the downstream end 145 of the vane 140. An outlet duct 170 may be centrally aligned with the housing 111 and the airflow. An entrance end 175 of the duct 170 may be positioned inside the downstream end 145 defining a gap 147 between the housing 111 and the duct 170. The inner strainer shell 150 may surround the downstream end 145 and the entrance end 175 so that the gap 147 leads into the inner strainer shell 150. The inner strainer shell 150 may be permeable. For example, the strainer shell 150 may be a cylinder with an array of small diameter, equidistantly spaced holes (FIG. 2A). The array may comprise multiple rings of holes arranged in a manner where the holes in one row may be circumferentially offset relative to the holes in the next row. The holes may be sized to permit passage of the liquid particles through the strainer shell 150 while minimizing turbulent air from entering into the strainer shell 150 and liquid particles that have entered the chamber in the outer shell 160 from escaping back into the main airstream. An outer shell 160 may surround the inner shell 150. The outer shell 160 may include a drain 165 at the lowest of the outer shell 160.

In operation, liquid droplets entering the inertial-based separator 120 from the charging system 110 may encounter the vane 140 which may impart a centrifugal motion to the airstream and begin a swirling motion inside the inertial-based separator 120. The result may provide that the larger droplets (for example, heavier liquid particles) in the airstream may be flung outward by the centrifugal motion directed toward the periphery 143 of the inertial-based separator 120. Liquid droplets at the periphery 143 may pass through the gap 147 into the inner strainer shell 150. Liquid droplets in the inner strainer shell 150 may be drawn through the holes by pressure into the outer shell 160 where liquid may collect and be drawn through the electronic particle separation system 100 through the drain 165. Meanwhile, airflow with lower liquid content may proceed though the center of the vane 140, into the entrance end 175, into the duct 170, and onward to the destination 90.

Figure 3:
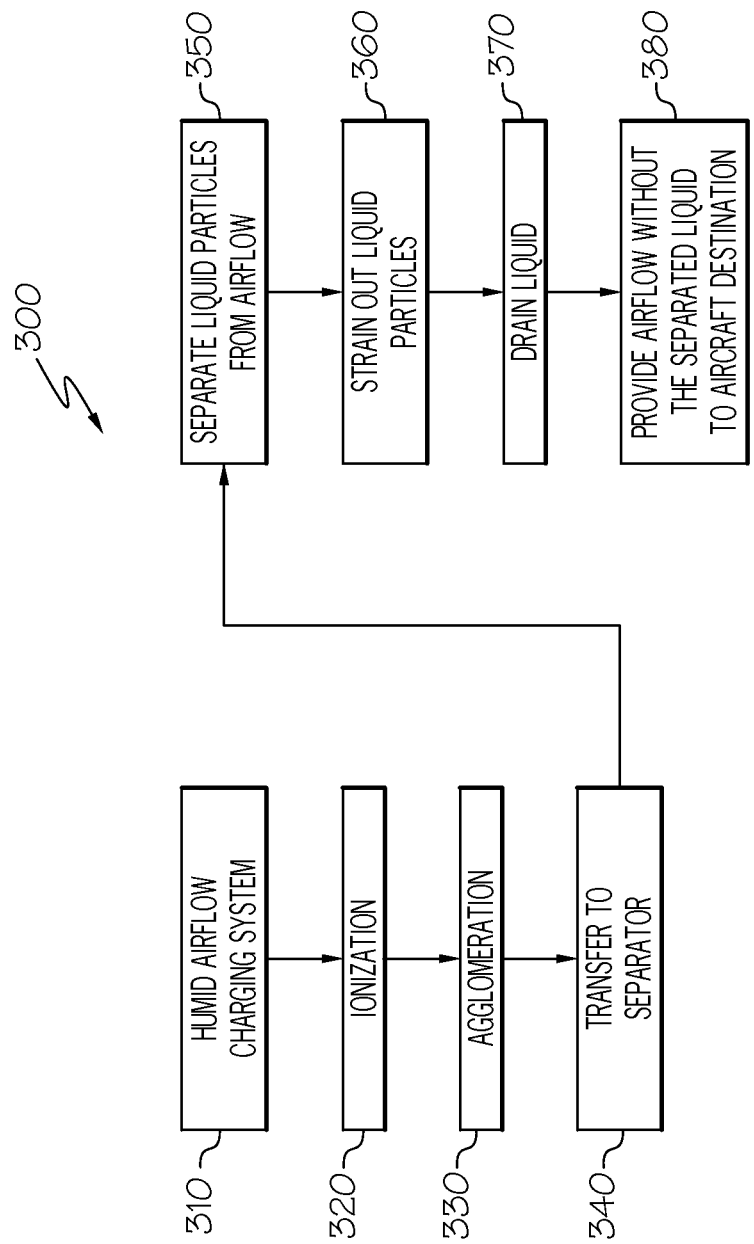

Referring now to FIG. 3, a method 300 of controlling humidity in an aircraft using an electronic particle separation system, for example, the electronic particle separation system 100 is shown in FIG. 2 according to an exemplary embodiment of the present invention. In block 310, an airstream containing liquid particles may be provided from a source in an aircraft ECS, into a charging system. In block 320, the liquid particles in the charging system may be ionized. In block 330, ionized liquid particles may be agglomerated into larger liquid droplets. In block 340, the ionized liquid droplets may be transferred to an inertial-based separator. In block 350, the ionized liquid droplets may be separated from the airstream by the separator. For example, the ionized liquid droplets may be centrifugally directed by a vane to the periphery of the separator. In block 360, the collected liquid particles may be strained out of the airstream by a strainer shell. In block 370, the strained liquid particles may be drained from an outer shell. In block 380, the airflow, without the collected liquid particles, may be provided to a destination in the aircraft.

It should be understood, of course, that the foregoing relates to exemplary embodiments of the invention and that modifications may be made without departing from the spirit and scope of the invention as set forth in the following claims.

We claim:

1. An electronic particle separation system in an aircraft Environmental Control System (ECS), comprising:
    a humidity source;
    a particle charging stage that includes;
        an inner electrode;
        a first outer electrode on the inner electrode, wherein the first outer electrode has a first size;
        a outer electrode on the inner electrode, wherein the second outer electrode has a second size different from the first size;
        a third outer electrode on the inner electrode, wherein third outer electrode has a third size different from the first size and the second size;
        a first segment formed between the first outer electrode and the second outer electrode, and
        a second segment formed between the second outer electrode and the third outer electrode,
        wherein the particle charging stage is configured to electrically charge an airstream provided by the humidity source; and
    a particle separator stage configured to collect liquid particles separated from the charged airstream.

2. The electronic particle separation system of claim 1, wherein the particle charging stage is configured to ionize the airstream.

3. The electronic particle separation system of claim 2, wherein the particle charging stage is configured to agglomerate the ionized liquid particles as the airstream progresses through the particle charger.

4. The electronic particle separation system of claim 3, wherein the particle charging stage is configured to move the charged liquid particles radially away from the airstream.

5. The electronic particle separation system of claim 1, wherein the particle separator stage is configured to centrifugally move the liquid particles to a periphery of a housing.

* * * * *